United States Patent
Va et al.

(10) Patent No.: US 12,066,528 B2
(45) Date of Patent: Aug. 20, 2024

(54) DETERMINING RELEVANT GESTURE SIGNALS USING MULTI-DIMENSIONAL RADAR SIGNALS

(71) Applicant: Samsung Electronics Co., Ltd., Suwon-si (KR)

(72) Inventors: Vutha Va, Plano, TX (US); Mandar Kulkarni, Richardson, TX (US); Boon Loong Ng, Plano, TX (US); Pengda Huang, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/050,403

(22) Filed: Oct. 27, 2022

(65) Prior Publication Data

US 2023/0079979 A1 Mar. 16, 2023

Related U.S. Application Data

(62) Division of application No. 16/680,339, filed on Nov. 11, 2019, now Pat. No. 11,555,915.

(Continued)

(51) Int. Cl.
*G01S 13/89* (2006.01)
*G01S 7/41* (2006.01)
(Continued)

(52) U.S. Cl.
CPC ............... *G01S 13/89* (2013.01); *G01S 7/41* (2013.01); *G01S 13/52* (2013.01); *G06V 40/166* (2022.01); *G06V 40/172* (2022.01)

(58) Field of Classification Search
CPC ......... G01S 13/89; G01S 7/41; G06V 40/166; G06V 40/172
See application file for complete search history.

(56) References Cited

U.S. PATENT DOCUMENTS

| 10,222,469 B1 * | 3/2019 | Gillian ..................... G01S 13/56 |
| 2006/0023915 A1 * | 2/2006 | Aalbu ....................... G01S 13/04 |
| | | 382/103 |

(Continued)

FOREIGN PATENT DOCUMENTS

| EP | 3299841 A1 | 3/2018 |
| KR | 10-2018-0012059 A | 2/2018 |
| WO | 2017143217 A1 | 8/2017 |

OTHER PUBLICATIONS

Holz et al., "Chapter 4: Fast 3D Perception for Collision Avoidance and SLAM in Domestic Environments", in: Mobile Robots Navigation, Alejandra Barrera (Ed.), InTech, Mar. 2010, pp. 53-84.

(Continued)

*Primary Examiner* — Donald H B Braswell

(57) ABSTRACT

A method and electronic device for determining relevant signals in radar signal processing. The electronic device includes a radar transceiver, a memory, and a processor. The processor is configured to cause the electronic device to obtain, via the radar transceiver of the electronic device, radar measurements for one or more modes in a set of modes; process the radar measurements to obtain a set of radar images; identify relevant signals in the set of radar images based on signal determination criteria for an application; and perform the application using only the relevant signals.

20 Claims, 9 Drawing Sheets

Related U.S. Application Data

(60) Provisional application No. 62/812,483, filed on Mar. 1, 2019.

(51) Int. Cl.
  G01S 13/52 (2006.01)
  G06V 40/16 (2022.01)

(56) References Cited

U.S. PATENT DOCUMENTS

| | | | |
|---|---|---|---|
| 2013/0251194 A1* | 9/2013 | Schamp | G06T 7/11 |
| | | | 382/199 |
| 2013/0321195 A1 | 12/2013 | Moriuchi et al. | |
| 2015/0204972 A1 | 7/2015 | Kuehnle et al. | |
| 2017/0242102 A1 | 8/2017 | Dussan et al. | |
| 2018/0031681 A1 | 2/2018 | Yoon et al. | |
| 2018/0157330 A1* | 6/2018 | Gu | G01S 7/415 |
| 2019/0137601 A1* | 5/2019 | Driscoll | G01S 13/424 |
| 2019/0240535 A1* | 8/2019 | Santra | A61B 5/05 |
| 2020/0064996 A1* | 2/2020 | Giusti | G01S 13/88 |
| 2020/0234030 A1* | 7/2020 | Baheti | G01S 7/412 |

OTHER PUBLICATIONS

International Search Report and Written Opinion of the International Searching Authority in connection with International Application No. PCT/KR2020/002974 dated Jun. 24, 2020, 7 pages.

* cited by examiner

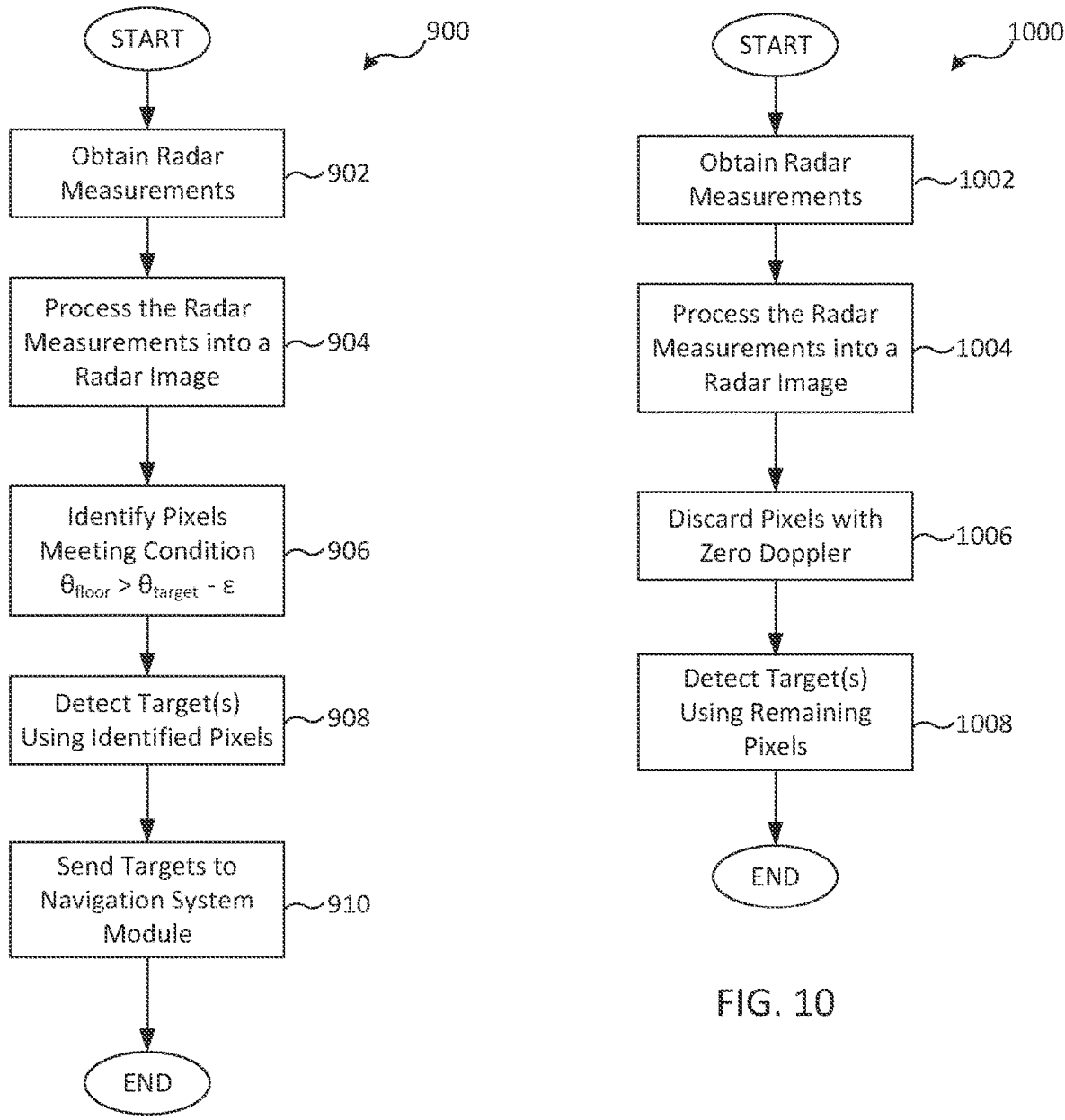

DETERMINING RELEVANT GESTURE SIGNALS USING MULTI-DIMENSIONAL RADAR SIGNALS

CROSS-REFERENCE TO RELATED APPLICATION AND CLAIM OF PRIORITY

This application is a divisional of U.S. patent application Ser. No. 16/680,339 filed Nov. 11, 2019, which claims priority under 35 U.S.C. § 119(e) to U.S. Provisional Patent Application No. 62/812,483 filed Mar. 1, 2019, the contents of which are incorporated herein by reference in their entirety.

TECHNICAL FIELD

The present disclosure relates generally to signal selection in radar applications. More specifically, the present disclosure relates to determination of relevant signals from radar images for electronic devices executing applications using radar-based input.

BACKGROUND

Radar is a detection system utilizing radio waves in various frequency bands including, but not limited to, 6-8 GHz, 28 GHz, 39 GHz, 60 GHz, and 77 GHz. Radar operates to localize targets in the radar field-of-view in terms of azimuth (range) and/or elevation (angle) and/or speed. Examples of conventional use cases for radar includes proximity sensing, gesture recognition, anti-spoofing, and context detection for electronic devices.

SUMMARY

Embodiments of the present disclosure include a method, an electronic device, and a non-transitory computer readable medium for determining relevant signals. In one embodiment, the electronic device includes a radar transceiver, a memory, and a processor. The processor is configured to cause the electronic device to obtain, via the radar transceiver of the electronic device, radar measurements for one or more modes in a set of modes; process the radar measurements to obtain a set of radar images; identify relevant signals in the set of radar images based on signal determination criteria for an application; and perform the application using only the relevant signals.

In another embodiment, a method for signal selection by an electronic device includes obtaining, via a radar transceiver of the electronic device, radar measurements for one or more modes in a set of modes; processing the radar measurements to obtain a set of radar images; identifying relevant signals in the set of radar images based on signal determination criteria for an application; and performing the application using only the relevant signals.

In another embodiment, an electronic device includes a non-transitory computer readable medium. The non-transitory computer readable medium stores instructions that, when executed by the processor, causes the electronic device to obtain, by a radar transceiver of the electronic device, radar measurements for one or more modes in a set of modes; process the radar measurements to obtain a set of radar images; identify relevant signals in the set of radar images based on signal determination criteria for an application; and perform the application using only the relevant signals.

Other technical features may be readily apparent to one skilled in the art from the following figures, descriptions, and claims.

Before undertaking the DETAILED DESCRIPTION below, it may be advantageous to set forth definitions of certain words and phrases that may be used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning "and/or". The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts:

FIG. 9 illustrates a flowchart of an alternate process for determining relevant signals for obstacle avoidance according to various embodiments of the present disclosure;

FIG. 10 illustrates a flowchart of a process for determining relevant signals for motion detection according to various embodiments of the present disclosure;

DETAILED DESCRIPTION

The figures included herein, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

Some systems and methods for utilizing radar measurements involves capturing and processing all radar signals received from a radar antenna's field-of-view. Not all the radar signals are relevant or necessary. For example, an autonomous robot navigating through a house can detect underground metallic pipes. Existing navigational methods waste computational resources by processing a comprehensive radar image that takes the underground metallic pipes into consideration. The comprehensive radar image is then processed and fed into a navigation algorithm to determine the best way to proceed in view of the underground metallic pipes. If the pipes in this example are not identified as underground, then the robot may need to re-plan its path to avoid traversing the underground obstacle. The ability to identify irrelevant targets, such as underground pipes, would improve the efficiency of the robot's navigation system. Novel aspects of the present disclosure recognize that identification of the relevant signals of a radar image and by performing an application only using the relevant signals, processing is simplified, and performance is improved. The novel aspects of the various non-limiting embodiments can be implemented in electronic devices, an example of which is included in FIG. 1.

Figure 1:
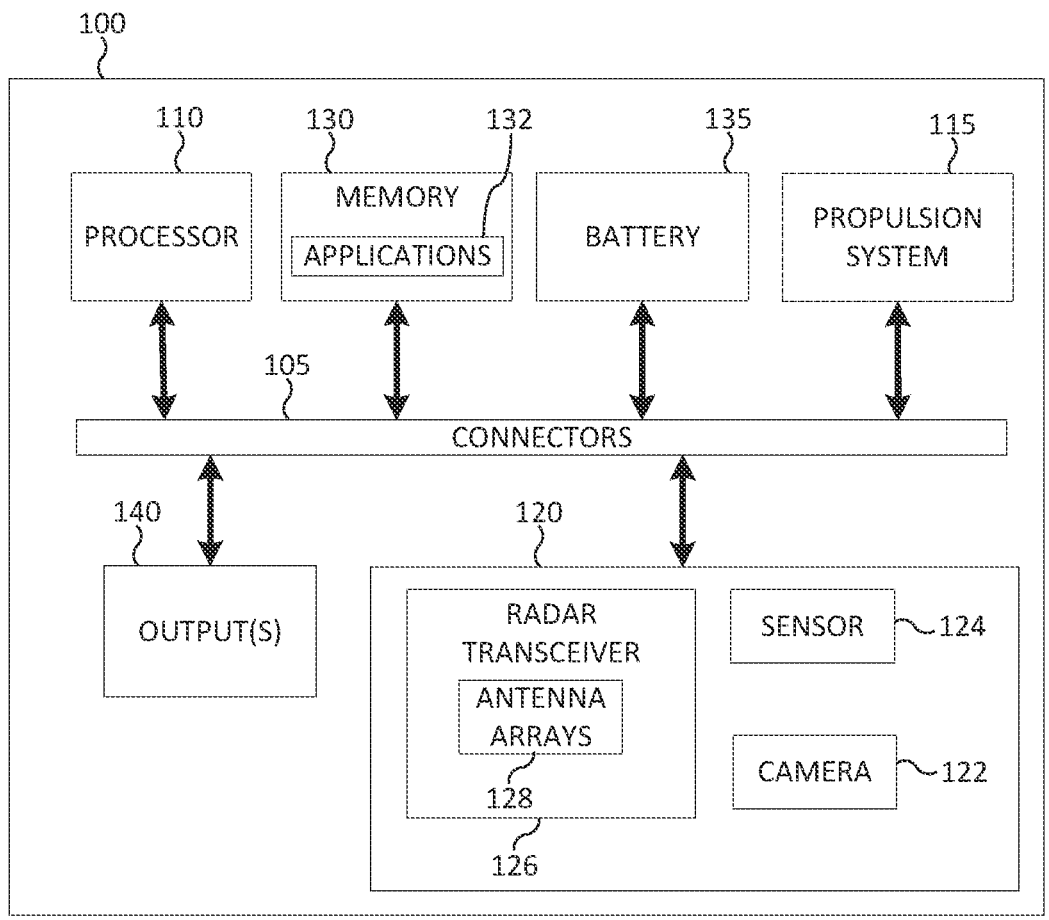
FIG. 1 illustrates an electronic device configurable to determine relevant signals according to various embodiments of the present disclosure.

FIG. 1 illustrates an electronic device configurable to determine relevant signals according to various embodiments of the present disclosure. The embodiment of the electronic device 100 shown in FIG. 1 is for illustration only and should not be deemed limiting.

The exemplary electronic device 100 includes connectors 105 that support communication among a processor 110, a set of modules 120, a memory 130, a battery 135, and one or more outputs 140. The connectors 105 can include one or more wires, a circuit board, a bus, a USB port, or any other suitable type of connector for providing an electrical connection between components in the electronic device 100.

The processor 110, which can execute instructions loaded into memory 130, can include any suitable number(s) and type(s) of processors or other devices in any suitable arrangement. Exemplary types of processor 110 include microprocessors, microcontrollers, digital signal processors, field programmable gate arrays, application specific integrated circuits, and discreet circuitry. The processor 110 can be a general-purpose CPU or specific purpose processor. Embedded software can run on the processor 110 to collect data from the one or more modules 120 for use by the electronic device 100 or for streaming the data to a cloud service or another device.

In some embodiments, the electronic device 100 can include an optional propulsion system 115. For example, in one or more embodiments where the electronic device 100 is a self-propelled device such as a vacuum cleaner, the electronic device 100 includes propulsion system 115 to impart movement to the electronic device. In some embodiments, the propulsion system 115 includes wheels and one or more motors. In other embodiments where the electronic device 100 is a mobile phone or tablet, the propulsion system can be omitted.

The set of modules 120 can be one or more modules including but not limited to a camera 122, one or more sensors 124, and one or more transceivers 126. Although described herein as including the camera 122, sensors 124, and one or more radar transceivers 126, this embodiment should not be construed as limiting and more or fewer modules can be included.

The camera 122 can be any type of camera utilized to capture images of an environment surrounding the electronic device 100. In some embodiments, one or more additional cameras 122 can be positioned to face different directions.

The sensor(s) 124 can include various sensors to capture data regarding the electronic device 100 or its surrounding environment. For example, sensor(s) 124 may include an odometer, an accelerometer, a gesture sensor, an eye tracking sensor, a gyroscope or gyro sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, a fingerprint sensor, and the like. The sensor(s) 124 can further include control circuits (not shown) for controlling at least one of the sensors included therein.

The radar transceiver 126 can include one or more antenna arrays 128 that includes a transmitter, a receiver, and processing circuitry. The transmitter can transmit millimeter wave (mmWave) signals at any number of conventional frequencies, such as a frequency less than or equal to 100 GHz. For example, the transmitter antenna array can transmit mmWave signals at a frequency of 60 GHz. The receiver can receive the mmWave signals originally transmitted from the transmitter after the mmWave signals have bounced or reflected off of target objects in the surrounding environment of the electronic device 100. The processor 110 can analyze the time difference between when the mmWave signals are transmitted and received to measure the distance of the target objects from the electronic device 100. The measured distance of target objects can then be used in simultaneous localization and mapping (SLAM) operations as well as navigation of the electronic device 100 through the environment.

The radar transceiver 126 can transmit signals to other components in a system and can receive incoming signals transmitted by other components in the system. For example, the transceiver 126 transmits and receives RF signals, such as BLUETOOTH or WI-FI signals, to and from an access point (such as a base station, WI-FI router, BLUETOOTH device) of a network (such as a WI-FI, BLUETOOTH, cellular, 5G, LTE, LTE-A, WiMAX, or any other type of wireless network). Incoming signals are processed by RX processing circuitry and outgoing data is processed by TX processing circuitry to generate a processed signal. The radar transceiver 126 receives the outgoing processed signal from the TX processing circuitry and converts the received signal to an RF signal that is transmitted via an antenna. In other embodiments, the transceiver 126 can transmit and receive radar signals to detect the potential presence of an object in the surrounding environment of the electronic device 100.

In this embodiment, one of the one or more transceivers in the transceiver 126 includes a radar transceiver 126 configured to transmit and receive signals for detection and ranging purposes. For example, the radar transceiver 126 may be any type of transceiver including, but not limited to a WiFi transceiver, for example, an 802.11 ay transceiver. The radar transceiver 126 includes antenna array(s) 128 that can include transmitter arrays and receiver arrays. The radar transceiver 126 can transmit signals at a frequency less than or equal to 100 GHz. For example, the transceiver 126 can transmit signals at frequencies including, but not limited to, 6-8 GHz, 28 GHz, 39 GHz, 60 GHz, and 77 GHz. In some embodiments, the signals transmitted by the radar transceiver 126 can include, but are not limited to, millimeter wave (mmWave) signals. The radar transceiver 126 can receive the signals, which were originally transmitted from the radar transceiver 126, after the signals have bounced or reflected off of target objects in the surrounding environment of the electronic device 100. The processor 110 can analyze the time difference between when the signals are transmitted by the radar transceiver 126 and received by the radar transceiver 126 to measure the distance of the target objects from the electronic device 100.

According to novel aspects of various embodiments, the radar transceiver 126 can be used to obtain radar measurements for one or more modes in a set of modes. As used herein a radar mode is a configuration setting usable to select among different antenna configurations and/or radar timing configurations. In some non-limiting embodiments, antenna configurations can specify beamforming methods and weights, the number of active arrays for transmitting and/or receiving, specific antenna indices for transmitting and/or receiving, etc. Radar timing configurations specify settings such as number of pulses, a number of bursts, pulse duration, burst duration, or any other setting that can be used to determine a rate of obtaining radar measurements.

The memory 130 represents any structure(s) capable of storing and facilitating retrieval of information (such as data, program code, and/or other suitable information on a temporary or permanent basis). The memory 130 can represent a random-access memory or any other suitable volatile or non-volatile storage device(s), including, for example, a read-only memory, hard drive, or Flash memory. In addition, the memory 130 can include an operating system (OS) (not shown) and one or more applications 132.

The processor 110 is also capable of executing the applications 132 in response to operator input or from received signals. In some embodiments, the memory 130 is further configured to store data, such as radar measurements captured by the operation of antenna arrays 128, or radar images derived from the radar measurements, which can be used for determining relevant signals according to one or more of the various disclosed embodiments. For example, radar measurements obtained by radar transceiver 126 can be used by one or more applications 132 to accomplish a specific task, such as face authentication, motion detection, or navigation. The processor 110 can process the radar measurements into a radar image that can be used to determine relevant signals for inputting into the one or more applications. By identifying relevant signals and/or discarding irrelevant signals, the amount of processing is reduced.

The battery 135 provides power to the various components of electronic device 100 and can include one or more induction charging coils. For example, the battery 135 can include or be connected to an induction charging coil to charge battery wirelessly.

The output(s) 140 provide feedback, control, and/or visual signals to persons and/or objects in proximity to the electronic device 100. For example, the output(s) 140 can sound alerts, display lights or video, or generate signals to wirelessly control external objects. Example type of output(s) 140 that can be included within the electronic device 100 include speaker(s), light(s), laser pointer(s), a video projector, a remote controller (e.g., such as an IR or RF remote controller), a display (e.g., LCD or LED display), etc. For example, the electronic device 100 can provide an alert via sounds or lights (e.g., dutiable or visual alerts) generated by the output(s) 140 when a certain condition is automatically recognized, at a certain time, or upon receipt of a request from the user application.

A common type of radar is the "monostatic" radar, characterized by the fact that the transmitter of the radar signal and the receiver of the resulting, delayed echo are, for all practical purposes, in the same location. Monostatic radars are assumed coherent, i.e., transmitter and receiver are synchronized via a common time reference. Monostatic radar is commonly found in consumer electronics, like phones and other portable electronic devices, due to space limitations. While novel aspects of certain embodiments may be described relative to monostatic radar, these novel aspects can also be implemented in bistatic radar and multi-static radar.

Figure 2:
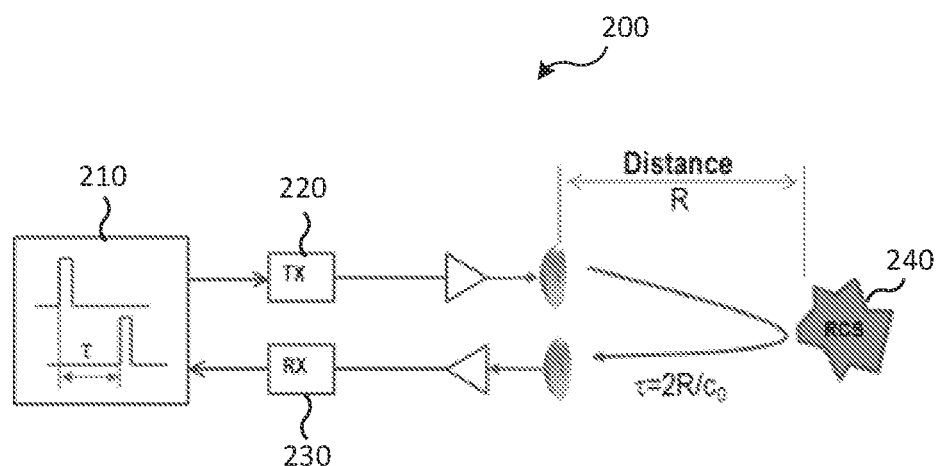
FIG. 2 illustrates a monostatic radar usable for determining relevant signals according to various embodiments of the present disclosure.

FIG. 2 illustrates a monostatic radar usable for determining relevant signals according to various embodiments of the present disclosure. The embodiment of the monostatic radar 200 shown in FIG. 2 is for illustration only and other embodiments can be used without departing from the scope of the present disclosure. The monostatic radar 200 illustrated in FIG. 2 includes a processor 210, a transmitter 220, and a receiver 230. In some embodiments, the processor 210 can be the processor 110.

In some embodiments, the transmitter 220 and the receiver 230 are included in the antenna arrays 128 in radar transceiver 126 in FIG. 1. In various embodiments, the transmitter 220 and the receiver 230 are co-located using a common antenna or nearly co-located while separate but adjacent antennas. The monostatic radar 200 is assumed to be coherent such that the transmitter 220 and the receiver 230 are synchronized via a common time reference.

The processor 210 controls the transmitter 220 to transmit a radar signal or radar pulse. The radar pulse is generated as a realization of a desired "radar waveform" modulated onto a radio carrier frequency and transmitted through a power amplifier and antenna (shown as a parabolic antenna), such as the transmitter 220, either omni-directionally or focused into a particular direction. After the radar pulse has been transmitted, a target 240 at a distance R from the radar 200 and within a field-of-view of the transmitted pulse will be illuminated by RF power density $p_t$ (in units of W/m$^2$) for the duration of the transmission. To the first order, $p_t$ is described by Equation 1:

$$p_t = \frac{P_T}{4\pi R^2} G_T = \frac{P_T}{4\pi R^2} \frac{A_T}{(\lambda^2 / 4\pi)} = P_T \frac{A_T}{\lambda^2 R^2},$$

where $P_T$ is a transmit power [W], $G_T$ is a transmit antenna gain [dBi], $A_T$ is an effective aperture area [m$^2$], $\lambda$ is a wavelength of the radar signal RF carrier signal [m], and R is the target distance [m].

The transmit power density impinging onto the target surface leads to reflections depending on the material composition, surface shape, and dielectric behavior at the frequency of the radar signal. Off-direction scattered signals are generally not strong enough to be received back at the receiver 230, so only direct reflections contribute to a detectable, received signal. Accordingly, the illuminated area or areas of the target with normal vectors directing back to the receiver 230 act as transmit antenna apertures with directivities, or gains, in accordance with their effective aperture area or areas. The reflected-back power $P_{refl}$ is described by Equation 2:

$$P_{refl} = p_t A_t G_t \sim p_t A_t r_t \frac{A_t}{(\lambda^2 / 4\pi)} = p_t RCS,$$

where $P_{refl}$ is an effective (isotropic) target-reflected power [W], $A_t$ is an effective target area normal to the radar direction [m$^2$], $r_t$ is a reflectivity of the material and shape [0, . . . , 1], $G_t$ is a corresponding aperture gain [dBi], and RCS is a radar cross section [m$^2$].

As depicted in Equation 2, the radar cross section (RCS) is an equivalent area that scales proportionally to the square of the actual reflecting area, is inversely proportional to the square of the wavelength, and is reduced by various shape factors and the reflectivity of the material itself. For example, for a flat, fully reflecting mirror of an area $A_t$, large compared with $\lambda^2$, RCS=$4\pi A_t^2/\lambda^2$. Due to the material and shape dependency, it is difficult to deduce the actual physical area of the target 240 based on the reflected power even if the distance R from the target to the radar 200 is known.

The target-reflected power at the location of the receiver 230 is based on the reflected-power density at the reverse distance R, collected over the receiver antenna aperture area. The received, target-reflected power $P_R$ is described by Equation 3:

$$P_R = \frac{P_{refl}}{4\pi R^2} A_R = P_T \cdot RCS \frac{A_T A_R}{4\pi \lambda^2 R^4},$$

where $P_R$ is the received, target-reflected power [W] and $A_R$ is the receiver antenna effective aperture area [m$^2$]. In some embodiments, $A_R$ can be the same as $A_T$.

Such a radar system is usable as long as the receiver signal exhibits a sufficient signal-to-noise ratio (SNR). The particular value of the SNR depends on the waveform and detection method used. The SNR is described by Equation 4:

$$SNR = \frac{P_R}{kT \cdot B \cdot F},$$

where kT is Boltzmann's constant x temperature [W/Hz], B is the radar signal bandwidth [Hz], and F is the receiver noise factor, referring to the degradation of receive signal SNR due to noise contributions to the receiver circuit itself.

In some embodiments, the radar signal can be a short pulse with a duration, or width, denoted by $T_P$. In these embodiments, the delay $\tau$ between the transmission and reception of the corresponding echo will be equal to $\tau=2R/c$, where c is the speed of light propagation in the medium, such as air. In some embodiments, there can be several targets 240 at slightly different distances R. In these embodiments, the individual echoes of each separate target 240 is distinguished as such only if the delays differ by at least one pulse width, and the range resolution of the radar is described as $\Delta R=c\Delta\tau/2=cT_P/2$. A rectangular pulse of duration $T_P$ exhibits a power spectral density $P(f)\sim(\sin(\pi f T_P)/(\pi f T_P))^2$ with the first null at its bandwidth $B=1/T_P$. Therefore, the connection of the range resolution of a radar with the bandwidth of the radar waveform is described by Equation 5:

$$\Delta R = c/2B$$

Various forms of radar signals exist depending on the radar type. One example is the Channel Impulse Response (CIR) that measures the reflected signals (or echoes) from objects as a function of distance to the receive antenna module. The CIR measurements can be collected from various transmit and/or receive antenna configurations, which can be combined and processed to produce multidimensional images of the surrounding environment. The multidimensional image can provide a rich input signal for various applications such as robot navigation, gesture recognition, and face authentication. Non-limiting examples of the various dimensions could include the azimuth, elevation, range, and speed (i.e., Doppler).

This ability to image the surrounding environment in different dimensions allows for signal differentiation so that a radar image can be processed to identify only those signals that are relevant for a particular application and discard or ignore irrelevant signals. As a result, processing is more efficient and robust. For example, a navigation application executing on an electronic device traveling on flat terrain may require identification of only those objects close to the terrain. In such a scenario, only radar signals for a narrow interval of elevation angles are of interest and should be input into a map building algorithm for navigation purposes.

The CIR can be generated based on measurements obtained from a pulse compression radar system in which time is divided into frames, and frames are divided into bursts formed from several short pulses. An exemplary timing diagram for radar transmissions implementing novel aspects of the present disclosure is depicted in the figure that follows.

Figure 3:
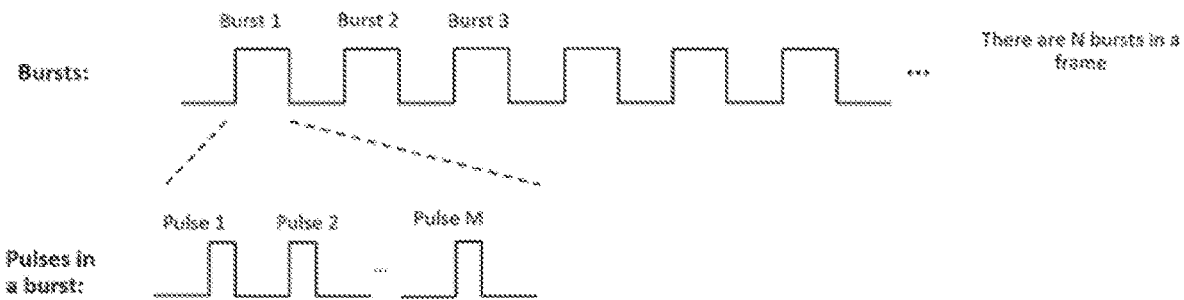
FIG. 3 illustrates a timing diagram for radar transmissions usable for determining relevant signals according to various embodiments of the present disclosure.

FIG. 3 illustrates a timing diagram for radar transmissions usable for determining relevant signals according to various embodiments of the present disclosure. Each frame includes a number of bursts N, illustrated as Burst 1, Burst 2, Burst 3, up to Burst N. Each burst is formed from a plurality of pulses. For example, FIG. 3 illustrates that Burst 1 comprises a plurality of pulses referenced as Pulse 1, Pulse 2, etc. through Pulse M. The particular number of pulses and bursts and their respective durations in this timing diagram in FIG. 3 is an example of a radar mode according to various embodiments of the disclosure.

For example, in Burst 1 a radar transceiver, such as transceiver 126, can transmit Pulse 1, Pulse 2, and Pulse M. In Burst 2, the transceiver 126 can transmit similar pulses Pulse 1, Pulse 2, and Pulse M. Each different pulse (Pulse 1, Pulse 2, and Pulse M) and burst (Burst 1, Burst 2, Burst 3, etc.) can utilize a different transmission/reception antenna configuration, that is the active set of antenna elements and corresponding analog/digital beamforming weights, to identify the specific pulses and bursts. For example, each pulse or burst can utilize a different active set of antenna elements and corresponding analog/digital beamforming weights to identify specific pulses and bursts. Each of these various antenna configurations is another example of a radar mode according to various embodiments of the disclosure.

Following each frame, a processor, such as the processor 110, connected to a radar transmitter in the antenna array(s) 128 obtains radar measurements at the end of each frame. For example, the radar measurements can be depicted as a three-dimensional complex CIR matrix. The first dimension may correspond to the burst index, the second dimension may correspond to the pulse index, and the third dimension may correspond to the delay tap index. The delay tap index can be translated to the measurement of range or time of flight of the received signal.

Figure 4:
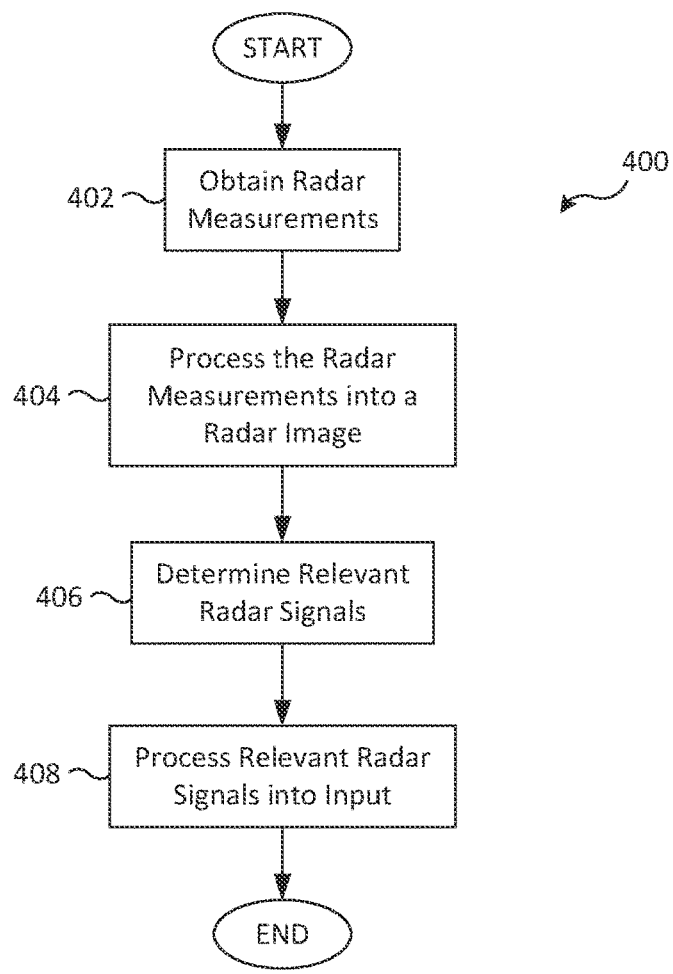
FIG. 4 illustrates a flowchart of a process for determining relevant signals of a radar image according to various embodiments of the present disclosure.

FIG. 4 illustrates a flowchart of a process for determining relevant signals of a radar image according to various embodiments of the present disclosure. The flowchart 400 can be implemented by a processor in an electronic device, such as processor 110 in electronic device 100. The process starts in step 402 by obtaining radar measurements. A non-limiting example of radar measurements is the channel impulse response (CIR) of a pulse compression radar system that can be obtained by a radar transceiver, such as radar transceiver 126 in FIG. 1. The radar measurements are then processed into a radar image in step 404. Examples of signal processing that can be applied include receive beamforming, or some form of beam combining with Fourier transform, or other types of processing that combines radar measurements into to a multi-dimensional radar signal, which may also be referred to in the alternative as a "radar image". While the radar measurements could be a three-dimensional CIR matrix as mentioned earlier, which might not have a well-defined physical meaning for each of its dimensions, the radar image will have a well-defined physical meaning for each of its dimensions. For example, a four-dimensional radar image can have dimensions corresponding to azimuth, elevation, range, and Doppler (i.e., speed).

In step 406 relevant radar signals are determined. The determination of relevant radar signals is based on signal determination criteria for an application, such as applications 132 in FIG. 1. As used herein, the signal determination criteria are a set of rules or definitions that can be used to differentiate relevant signals from irrelevant signals in the radar image. An example of an application can be a navigation application of an autonomous consumer electronic device, and the signal determination criteria can be used to differentiate between objects perceived by the radar to be on the floor (i.e., relevant signals) and objects perceived by the radar to be under the floor (i.e., irrelevant signals). In the navigation context, signal determination criteria may be referred to in the alternative as a "target identification condition."

The relevant radar signals can then be optionally processed in step 408 to convert the relevant signals into input usable by the application. In flowchart 400, the process ends after step 408, but in other embodiments the process may return to step 402 rather than ending.

Figure 5:
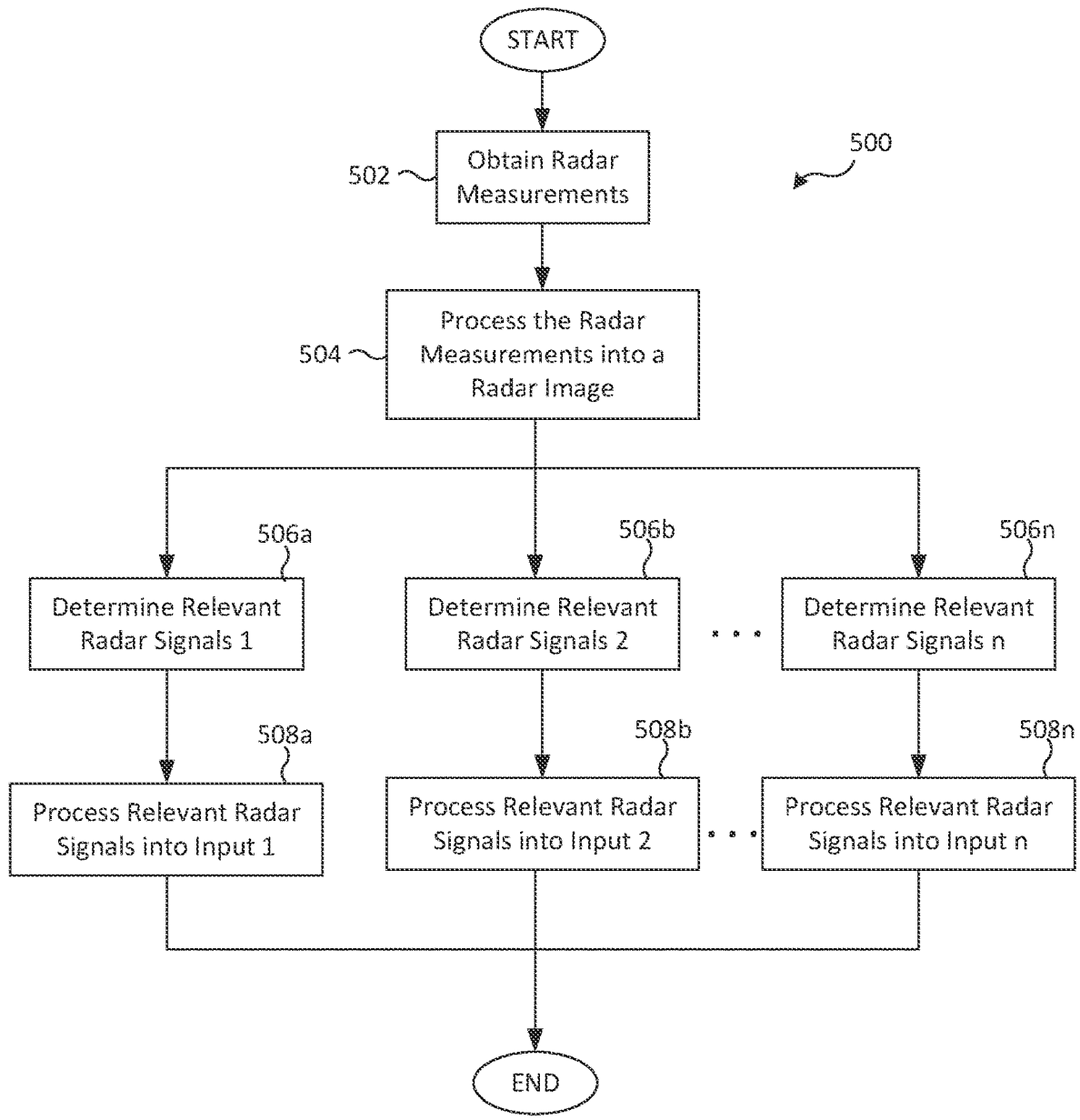
FIG. 5 illustrates a flowchart of a process for determining relevant signals of a radar image according to various embodiments of the present disclosure.

FIG. 5 illustrates a flowchart of a process for determining relevant signals of a radar image according to various embodiments of the present disclosure. A processor in an electronic device, such as processor 110 in electronic device 100, can execute instructions to cause the electronic device to accomplish the steps in flowchart 500 to determine relevant radar signals from a radar image based on a plurality of different signal determination criteria. Each set of relevant radar signals can then be processed to form an input usable by an application.

The process depicted in flowchart 500 begins at step 502 by obtaining radar measurements. The radar measurements are then processed into a radar image in step 504. Each of the N different signal determination criteria is applied to the radar image in step 506 to determine relevant radar signals 1 through n. Each set of relevant radar signals 1-$n$, as determined by each of the determination operations in step 506, can be processed into different inputs 1-$n$ in step 508 usable by one or more applications. Each of the processing operations in step 508 can use the same or different programs or algorithms. Additionally, each of the processing operations in step 508 can consist of multiple algorithms or programs to complete multiple different tasks that use the same input.

In the previous embodiments, a single radar mode was used to obtain one radar image that could be analyzed using one or more different signal determination criteria for determining sets of relevant signals. The sets of relevant signals could be used by one or more different applications to accomplish one or more tasks. In other embodiments, an electronic device can include a radar transceiver configured to operate in two or more different modes, each mode selected to provide better resolution for a different dimension.

Figure 6:
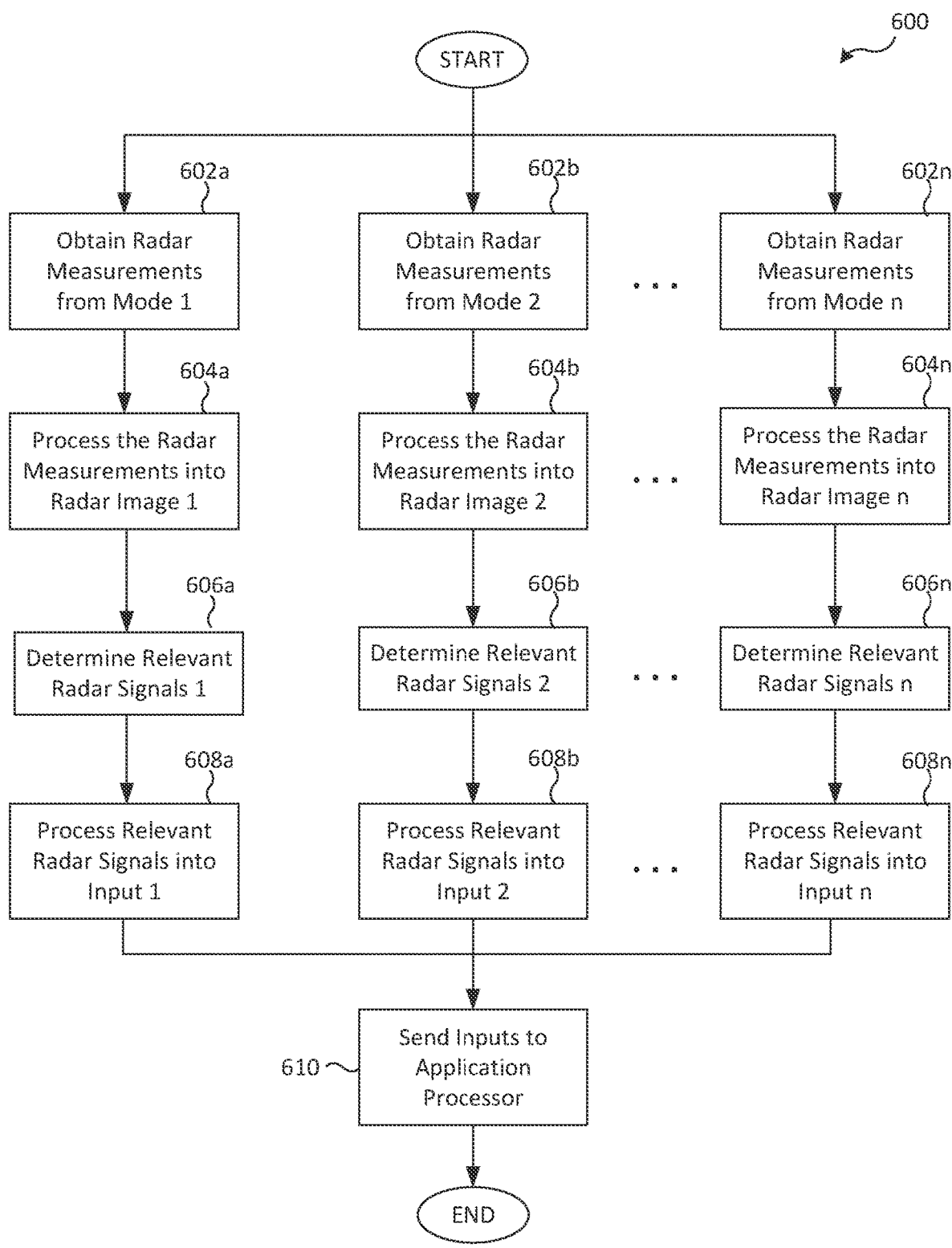
FIG. 6 illustrates a flowchart of a process for determining relevant signals using a plurality of different radar modes to generate a plurality of radar images according to various embodiments of the present disclosure.

FIG. 6 illustrates a flowchart of a process for determining relevant signals using a plurality of different radar modes to generate a plurality of radar images according to various embodiments of the present disclosure. A processor in an electronic device, such as processor 110 in electronic device 100, can execute instructions to cause the electronic device to accomplish the steps in flowchart 600.

The process begins at step 602 where radar measurements are obtained for each of N radar modes in operations 602$a$ through 602$n$. The radar measurements obtained in each of the various operations 602a, 602b, 602n in step 602 are processed into N radar images in step 604 in operations 604a, 604b, 604n. The radar images can be one-dimensional radar images, multi-dimensional radar images, or combinations thereof. For each of the N radar images obtained in step 604, relevant radar signals 1-n are determined in operations 606a, 606b, 606n in step 606. Thereafter, the relevant radar signals determined from step 606 are optionally processed into inputs 1-n in operations 608a, 608b, 608n in step 608.

Each of the inputs are sent to an application processor in step 610 for use in accomplishing a task. In flowchart 600, the process terminates after step 610; however, in an alternate embodiment the process returns to step 602 rather than terminating. In another embodiment, the radar signal processing in step 608 can be omitted and the relevant radar signals determined in step 606 can be sent directly to an application as inputs in step 610.

Figure 7:
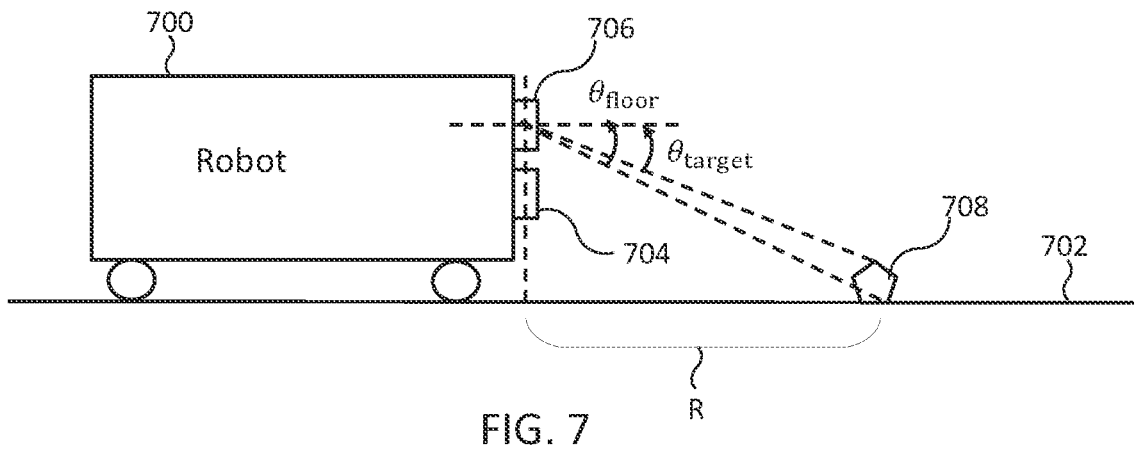
FIG. 7 illustrates a robot implementing a process for determining relevant signals for navigation according to various embodiments of the present disclosure.

FIG. 7 illustrates a robot implementing a process for determining relevant signals for navigation according to various embodiments of the present disclosure. The robot 700 can be a consumer electronic device, such as an automated, self-propelled vacuuming apparatus capable of navigating through a household using multimodal radar capturing a range dimension and an elevation dimension. In addition, the robot 700 can include a processor, such as processor 110 in FIG. 1 capable of executing instructions to cause the robot 700 to carry out the steps of one or more of navigation-based processes.

An exemplary application for robot 700 is navigation within its operating environment. The application can be broken down into several tasks including obstacle avoidance and/or Simultaneous Localization and Mapping (SLAM). Accurate radar scans of the environment are important to identify all relevant objects and obstacles. Certain types of objects could produce strong radar measurements but are nevertheless irrelevant for navigation. For example, metal pipes under the floor 702 could produce strong radar signals that have no bearing on object avoidance. Computation time and resources are wasted, and navigation algorithms could fail to properly address avoidance of these types of irrelevant objects.

Range and elevation dimensions of a radar image can be used to eliminate the irrelevant radar signals corresponding to objects located under the floor 702 or high above the robot 700 because those objects would not obstruct movement of the robot 700. For a household environment, the terrain is the floor 702 which can be reasonably assumed to be flat. For other environments, such as a factory that can have slanted floors, a floor map can be pre-programmed into the robot 700 to assist with the navigation task. Alternatively, non-radar sensor data can be captured to assist with the navigation task. The non-radar sensor data can be captured by sensors, such as sensors 124 in FIG. 1.

The robot 700 depicted in FIG. 7 has a radar transmitter 704 located beneath a radar receiver 706. In other embodiments, the radar transmitter 704 may be located above the radar receiver 706 or beside the radar receiver 706. In yet another embodiment, the radar transmitter and radar receiver may be implemented within a single module with one or more antennas shared between the transmitter and the receiver. In any of these non-limiting embodiments, the resultant radar measurement(s) captured by the radar receiver consists of two or more dimensions that includes at least range (i.e., delay) and elevation angle dimension. Given a range R of a target 708 and the mounting geometry of the radar receiver 706, namely the height of the radar receiver 706 relative to the floor 702, the elevation angle $\theta_{floor}$ can be determined. An elevation angle $\theta_{target}$ for the target 708 can also be determined in the same way. A comparison of $\theta_{floor}$ with $\theta_{target}$ can be used to determine whether the target 708 is on the floor 702 or under the floor 702. For example, for the given range R, the target is declared relevant (i.e., not under the floor) and will be passed to the navigation algorithm only if that target identification condition $\theta_{floor} > \theta_{target} - \epsilon$ is met, where $\epsilon$ can be selected to provide some tolerance to account for estimation inaccuracies or variation on the flatness of the floor 702.

Figure 8:
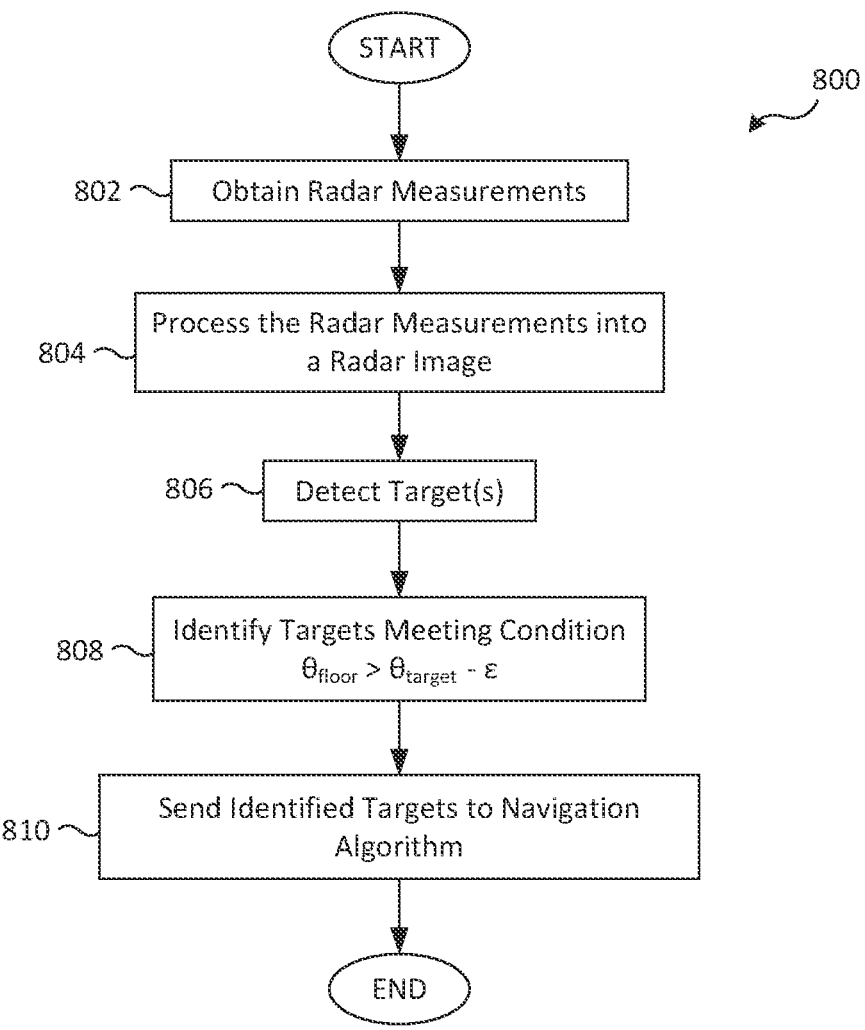
FIG. 8 illustrates a flowchart for a process for determining relevant signals for obstacle avoidance according to various embodiments of the present disclosure.

FIG. 8 illustrates a flowchart for a process for determining relevant signals for obstacle avoidance according to various embodiments of the present disclosure. A processor, such as processor 110 of electronic device 100, can execute instructions to cause the electronic device to perform the steps of flowchart 800. In a specific embodiment, the electronic device can be a robot 700 of FIG. 7, which can implement obstacle avoidance or Simultaneous Localization and Mapping (SLAM) as a feature in its navigation algorithm.

Flowchart 800 begins by obtaining radar measurements in step 802. In step 804, the radar measurements are processed into a radar image. The radar measurements are processed into a multi-dimensional radar image that includes the range (i.e., delay) and elevation angle. Thereafter, targets are detected in step 806. In a non-limiting embodiment, the multi-dimensional radar image is input into a conventional radar target detection algorithm to detect targets. An example of one common target detection algorithm is the constant false alarm rate (CFAR) detection algorithm. In step 808 targets meeting the target identification condition $\theta_{floor} > \theta_{target} - \epsilon$ are identified. The target identification condition takes into consideration the range and elevation angle of targets relative to a radar receiver, such as receiver 706 in FIG. 7 to determine which targets are on the floor and which targets are under the floor. In particular, targets that fail to meet the target identification condition are under the floor and are not relevant information for the navigation algorithm to consider. Thus, only the targets identified in step 808, which correspond to the relevant signals from the radar image obtained in step 804, are sent to the navigation algorithm in step 810.

FIG. 9 illustrates a flowchart of an alternate process for determining relevant signals for obstacle avoidance according to various embodiments of the present disclosure. A processor, such as processor 110 of electronic device 100, can execute instructions to cause the electronic device 100 to perform the steps of flowchart 900. In a specific embodiment, the electronic device can be a robot 700 of FIG. 7, which can implement obstacle avoidance or Simultaneous Localization and Mapping (SLAM) as a feature in its navigation algorithm.

The process depicted in flowchart 900 differs from the process depicted in flowchart 800 in that the target identification condition is applied to each pixel of a radar image rather than applying the target identification condition to each of the detected targets. For example, each pixel in a three-dimensional (3D) radar image consisting of the azimuth, elevation, and range dimensions can be identified by the coordinate (az,el,ra), where az, el, and ra are the azimuth angle, the elevation angle, and the range corresponding to that pixel. The target identification condition depends only on the elevation and range values of the pixel regardless of the azimuth value. In particular for a coordinate (az,el,ra) of a potential target, the target identification condition is $\theta_{floor}(ra) > el - \epsilon$. Restated, this target identification condition defines the region of interest within the radar image which can be predetermined from the geometry of the robot and the floor. Then, only radar image pixels that satisfy the target identification conditions are input to a detection algorithm such as a CFAR detection method. The output from this detection step can be directly input into the navigation system algorithm because target detection is only performed within the valid region (i.e., above the floor in this case) and any targets that are detected are necessarily within this valid region and capable of obstructing a robot's path.

The process in flowchart 900 begins by obtaining radar measurements in step 902. The radar measurements are processed into a radar image in step 904. As previously discussed, pixels meeting a predetermined target identification condition are identified in step 906. An exemplary target identification condition is $\theta_{floor} > \theta_{target} - \epsilon$. In step 908, targets are detected using the pixels identified in step 906, which correspond to relevant signals from the radar image obtained in step 904. The targets are sent to a navigation system module in step 910. In some embodiments, the process terminates after step 910; however, in other embodiments, the process returns to step 902 to continue monitoring for targets.

The embodiments described in FIG. 8 and FIG. 9 aim at rejecting under the floor targets that are not relevant to robot navigation. In the same manner, it is also possible to define target identification conditions for rejecting targets that are too high above the robot that cannot obstruct the robot's paths. For example, for a given range R such a target identification condition could be $\theta_{clear} < \theta_{target} - \epsilon$, where $\theta_{clear}$ denotes the elevation angle that provides sufficient clearance for the robot to pass under. Both these two target identification conditions can be included in the target identification condition used in FIG. 8 and FIG. 9.

At least some of the embodiments described thus far leverage the elevation and range dimensions to determine relevant radar signals for use by a navigation system. In these embodiments or others, an undesired signal or irrelevant target could also be differentiated by their geometrical location. For example, if it is known a priori that by the construct of the hardware, there will be a signal detected at certain ranges and angles with respect to the radar (such a signal could be the reflection from the radar cover or it could be direct signal from the transmitter module due to limited isolation), then such prior knowledge can be used to further refine screening criteria similar to those used in FIG. 8 and FIG. 9.

Antenna polarization could be added as another dimension in radar measurements. The radar image produced by different antenna polarizations will have different responses to different types of material of the objects. Certain types of materials are more reflective to the vertical polarization than the horizontal polarization and vice versa. Thus, by selecting the appropriate radar polarization dimension, the detection of certain types of objects could be more efficient. For example, for a household robot application where the radar antenna modules could be placed in proximity to the floor, floor reflection could cause unwanted clutter response. In this case, the vertical polarization produces more reflection from the floor than the horizontal polarization. Thus, by selecting only signals from the horizontal polarization, clutter response can be expected to decrease.

FIG. 10 illustrates a flowchart of a process for determining relevant signals for motion detection according to various embodiments of the present disclosure. A processor, such as processor 110 of electronic device 100, can execute instructions to cause the electronic device to perform the steps of flowchart 1000 to differentiate between moving objects and static objects.

To detect the presence of a human in a room, non-static objects are of more interest. Even humans attempting to sit or stand still, it is likely that there are still minor movements on the face or movements of hands and feet. All such movements, however small, can produce enough phase changes due to the small wavelength of the millimeter wave frequencies making it sensitive to small movements that can be detected in the Doppler domain (i.e., the speed domain). A radar image having a Doppler dimension can be used to discard pixels with zero Doppler (i.e., zero speed) and submit pixels with non-zero Doppler to a target detection step. This principle can be extended to tasks that involve detection of objects with a minimum moving speed of interest, or a range of moving speeds of interest relative to the radar. For such tasks, the radar signal/image pixels with the corresponding Doppler range can be discarded before the target detection step.

The process of determining relevant signals for motion detection described in flowchart 1000 begins at step 1002 by obtaining radar measurements. The radar measurements are processed into a radar image in step 1004. The radar image has at least a Doppler dimension (i.e., speed dimension) that can be used to identify pixels with zero and non-zero Doppler. Pixels with non-zero Doppler are discarded in step 1006, and targets are detected using the remaining pixels in step 1008. The process terminates thereafter, or in another embodiment the process returns to step 1002 to continuing monitoring for motion.

In this exemplary flowchart, pixels with zero Doppler are discarded in step 1006. In another embodiment, pixels associated with irrelevant radar signals can be ignored and pixels associated with relevant signals, i.e., pixels with non-zero Doppler, can be used in step 1008 to detect targets.

Figure 11:
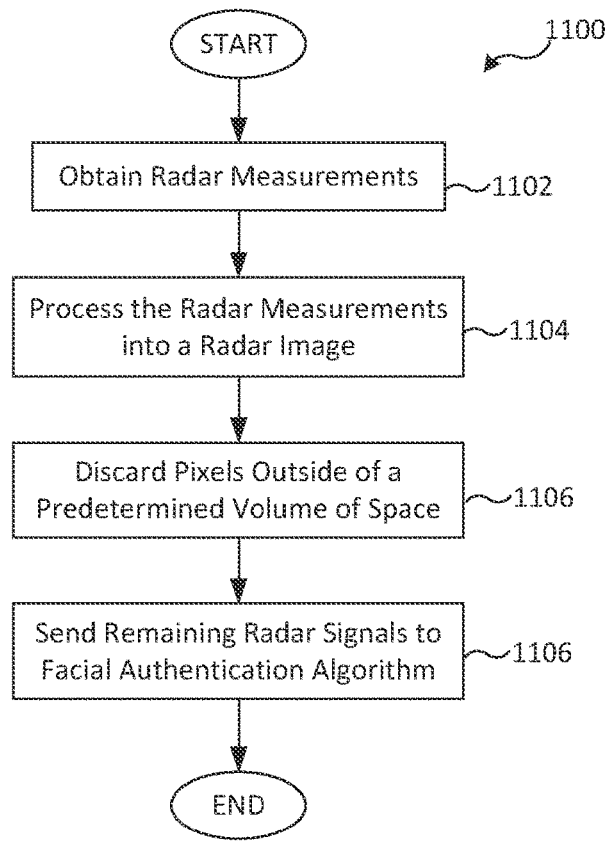
FIG. 11 illustrates a flowchart of a process for determining relevant signals for face authentication according to various embodiments of the present disclosure.

FIG. 11 illustrates a flowchart of a process for determining relevant signals for face authentication according to various embodiments of the present disclosure. A processor, such as processor 110 of electronic device 100, can execute instructions to cause the electronic device to perform the steps of flowchart 1100 to authenticate faces.

Azimuth, elevation, and range dimensions can be used to determine relevant signals corresponding to or influenced by a user's face to be input into face authentication algorithm. One way to do this is to crop the radar signals along the azimuth, elevation, range dimension to select only those radar pixels corresponding to the volume of space containing the user's head. Any number of different approaches can be used to determine the boundaries along the three dimensions for cropping. In one embodiment, the range estimate of the strongest radar signal can be used to determine the distance from the radar transceiver to user's head. Given this range the relevant interval along the azimuth and elevation angle can be calculated by assuming a certain size of the human's head. Because human head sizes vary, statistical data can be used to ensure that the estimated head size is large enough to avoid cropping out relevant radar signals. A tolerance parameter E can be considered to provide further buffer for avoiding cropping out relevant radar signals. While this example assumes a typical usage where the orientation of the electronic device and the orientation of the radar transceiver, is constrained by the usage and could be included as prior knowledge to account for the variation to define the boundaries for cropping the radar image. In other embodiments, the electronic device might be equipped with an inertial measurement unit (IMU) sensor that could provide information about the device orientation that can be used to compute the boundaries for the cropping whenever the application (e.g., face authentication) is initiated.

Returning to the flowchart 1100, the process begins by obtaining radar measurements in step 1102. The radar measurements can be captured by one or more radar modules operating under one or more different modes, as previously discussed. The radar measurements are processed into a radar image in step 1104. The radar image can be a multi-dimensional radar image with azimuth, elevation, and range dimensions, which are usable to identify a volume of space likely containing a user's head.

In step 1106, pixels located outside of the identified volume of space are deemed irrelevant and discarded or simply ignored. The remaining pixels correspond with signals that are determined to be relevant signals that are sent to a face authentication algorithm in step 1108. The process terminates thereafter.

The illustrative example discussed in FIG. 11 pertains to face authentication; however, the process can also be applied to other applications that involve target identification within some volume of space. Another exemplary application can involve gesture recognition.

The previous embodiments disclosed obtaining radar measurements for one or more different modes, but in discrete operations. For example, in FIG. 6, radar measurements for Mode 1 were obtained in operation 602a and radar measurements for Mode 2 were obtained in operation 602b. However, multiple radar modes can also be used concurrently for providing different resolutions in different dimensions of radar images that support different criteria for determining signals of interest. With reference again to a consumer electronic device with a navigation system, a dual-mode radar can generate inputs for a navigation application based on radar measurements obtained from a relatively far range (i.e., at least a few meters away) as well as radar measurements obtained from a relatively short range (i.e., a meter or less) that can be used to reliably detect objects in the nearby environment that are relevant for the navigation task. These two desired properties can conflict each other because a radar mode for far-range detection results in loss of resolution in the short range, which in turn results in reduced reliability and/or accuracy of target detection. As a more specific example, consider a two-mode radar, where Mode 1 uses analog beamforming at both the transmitter and the receiver and Mode 2 uses single antenna elements without beamforming to collect radar measurements. Using beamforming provides gains in the signal strength and will enable the radar to detect objects at farther distances. While providing additional signal strength, the radar measurements obtained through the beamforming are generally more difficult to apply more advanced methods such as a super-resolution algorithm (e.g., MUSIC or ESPRIT) that can provide accurate angle estimates with high resolution. The ability to estimate the elevation angles with high resolution is important for identifying under the floor objects as well as determining clearance for the robot to navigate underneath as described in earlier embodiments. In contrast, radar measurements collected using single transmit and receive antenna pairs in Mode 2 are more suitable for use with advanced, super-resolution algorithms. Accordingly, the target identification condition for each radar mode can be different. In the examples as shown in FIG. 8 and FIG. 9, one or more of $\theta_{clear}$, $\theta_{floor}$, and E can be different for the different radar mode. For example, E can be configured to be a smaller value for a radar mode that provides higher elevation resolution, and vice versa. In another example, E can be configured to be a smaller value for a radar mode that requires lower misdetection rate. On the other hand, E can be configured to be a higher value for a radar mode that requires lower false alarm rate.

Figure 12:
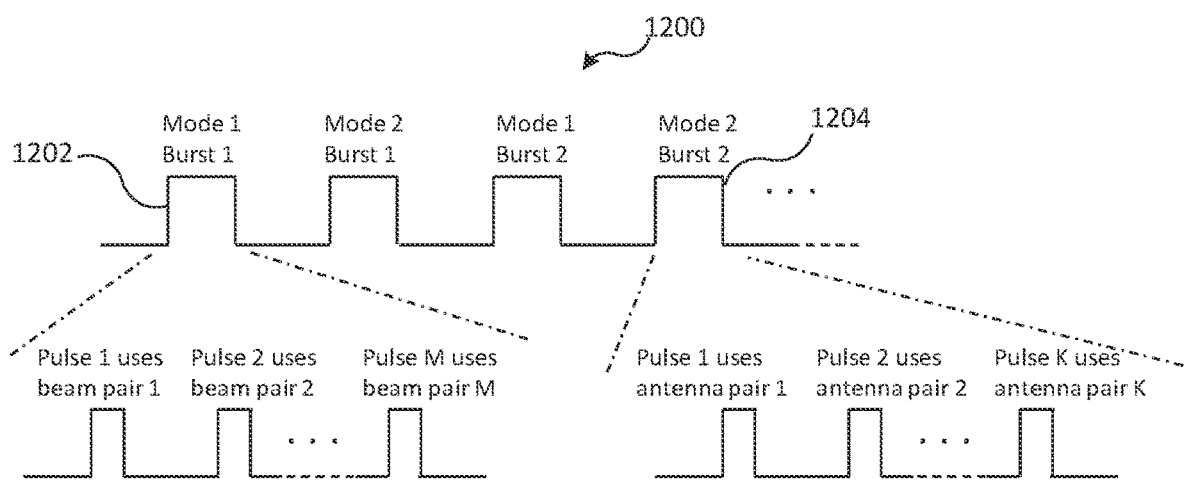
FIG. 12 illustrates a timing diagram of a frame accommodating concurrent operation of a dual mode radar according to various embodiments of the present disclosure.

FIG. 12 illustrates a timing diagram of a frame accommodating concurrent operation of a dual mode radar according to various embodiments of the present disclosure. Timing diagram 1200 depicts a frame structure with Mode 1 bursts 1202 interleaved with Mode 2 bursts 1204. In this non-limiting embodiment, number of bursts for the first radar mode (i.e., Mode 1) and the second radar mode (i.e., Mode 2) are equal, but in another embodiment the number of bursts for each radar mode can differ.

Radar configurations for each mode can be selected based upon required performance and constraints defined in system specifications. For example, bursts for Mode 1 can use transmit and receive analog beamforming to provide beamforming gain that boosts signal strength. Bursts for Mode 2 can use single transmit and receive antennas for radar measurement collection which is more suitable for fine angle estimation algorithms. Further, a burst for Mode 1 can be configured to have M pulses, while a burst for Mode 2 can be configured to have K pulses with M and K being non-equal integers and chosen according to the required performance and constraints defined in the specifications of the system. Various other structures of the frames could also be used. For example, two types of frames can be defined where Frame Type 1 only uses Mode 1 bursts and Frame Type 2 only uses Mode 2 bursts. The frequency of use of Frame Type 1 and Frame Type 2 can be selected according to the requirements of the task at hand. For instance, if the required update rate for the far-range detection is low, then the frequency of Frame Type 1 can be lesser than the frequency of Frame Type 2 to allow the update rate of radar measurements in the close range to be greater than that of the far range. Any number of different frame structures and associated radar configurations can be implemented.

Figure 13:
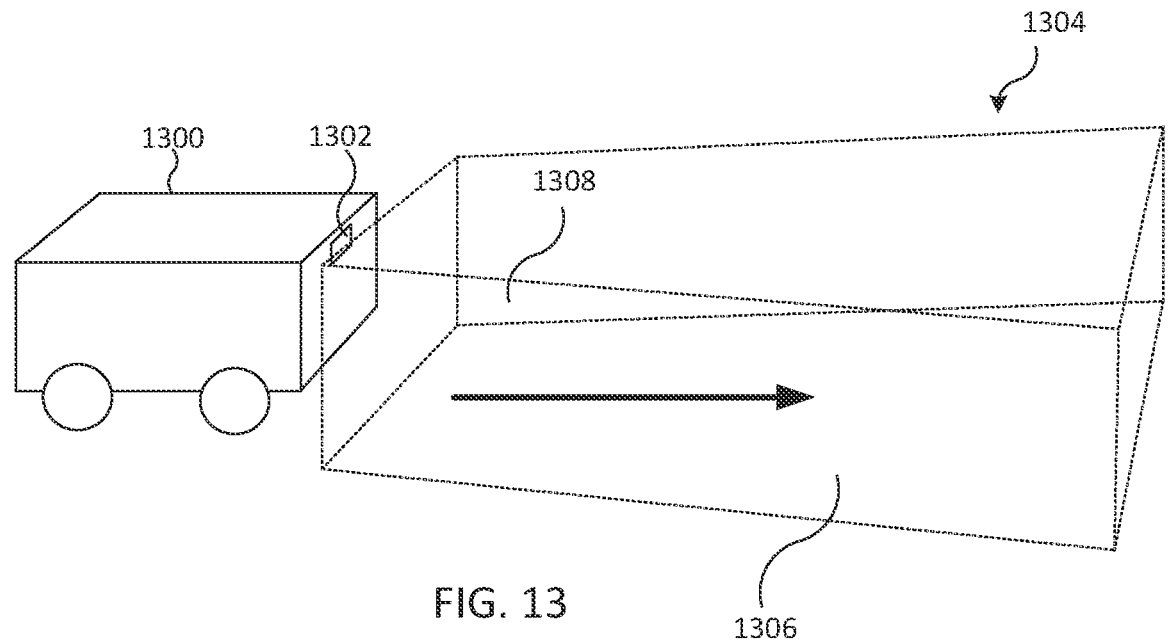
FIG. 13 illustrates a robot configured to implement a process for determining relevant signals for navigation using dual mode radar according to various embodiments of the present disclosure.

FIG. 13 illustrates a robot configured to implement a process for determining relevant signals for navigation using dual mode radar according to various embodiments of the present disclosure. The robot 1300 is an electronic device with a multimodal radar transceiver 1302 mounted in a forward-facing direction to capture radar measurements within its path 1304. Path 1304 has an azimuth dimension 1306 defined by a predetermined range of azimuth angles and an elevation dimension 1308 defined by a predetermined range of elevation angles. Objects of relevance are those that are in its path 1304. Restated, radar signals returning to the transceiver 1302 from within the path 1304 are relevant signals that can be used for navigation.

The radar transceiver 1302 can have a first mode (i.e., Mode 1) that provides high resolution in the azimuth dimension and a second mode (i.e., Mode 2) that provides high resolution in the elevation dimension. The high resolutions are possible by using two different antenna configurations. In one non-limiting example, the transmit and receive antennas of the radar transceiver 1302 are configured as linear arrays as shown in FIG. 14.

Figure 14:
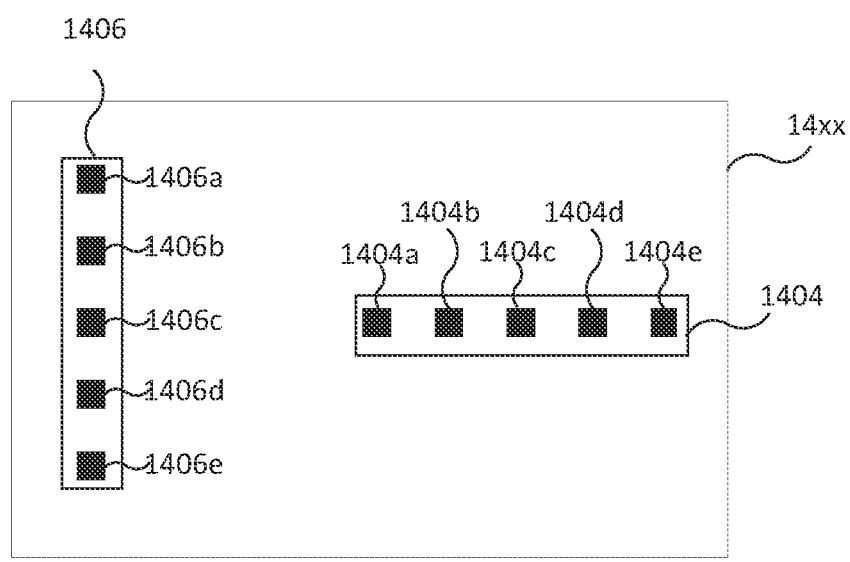
FIG. 14 illustrates a radar transceiver usable by a robot configured to implement a process for determining relevant signals for navigation using dual mode radar according to various embodiments of the present disclosure.

FIG. 14 illustrates a radar transceiver usable by a robot configured to implement a process for determining relevant signals for navigation using dual mode radar according to various embodiments of the present disclosure. The configuration of the transmit and receive antennas of radar transceiver 1402 can be used in radar transceiver 1302 in FIG. 13 for providing the robot 1300 with high resolution in the azimuth and elevation dimensions. In this non-limiting embodiment in FIG. 14, receiver array 1404 has five receiver elements 1404a-1404e arranged horizontally and the transmitter array 1406 has five transmitter elements 1406a-1406e arranged vertically. In another embodiment, the receiver array 1404 may be arranged vertically and the transmitter array 1406 may be arranged horizontally. In yet another embodiment, the number of transmit antennas in the transmitter array 1406 may differ from the number of receive antennas in the receiver array 1404 depending on a number of different factors, including availability of hardware and desired resolution in a domain of interest. For example, if higher resolution is needed in the elevation dimension, then a larger number of radar elements can be used for the vertical array, regardless of whether the vertical array is a transmitter array or receiver array.

To provide high resolution in the azimuth dimension with the antenna configuration depicted in FIG. 14, radar pulses may be transmitted from at least one transmitter element, such as a middle transmitter element 1406c of the transmitter array 1406 and received by two or more (or all) of the receiver elements 1404a-1404e of a receiver array 1404. The use of a plurality of receiver elements in the horizontal plane results in a large horizontal aperture that provides the high resolution in the azimuth dimension. In a particular embodiment, the pulses could be configured to use transmit antenna 1406c and receive antenna i (e.g., $RX_i$) for the Pulse i, for i={1,2,3,4,5}.

To provide high resolution in the elevation dimension, radar pulses may be transmitted from two or more (or all) of the transmitter elements 1406a-1406e of the transmitter array 1406 and received by at least one receiver element, such as receiver element 1404c in receiver array 1404. The use of two or more transmitter elements in the vertical plane results in a large vertical aperture that provides the high resolution in the elevation dimension. In a particular embodiment, the pulse configuration can use $TX_i$ and RX3 for Pulse i, where i={1,2,3,4,5}. The bursts of the two modes may be interleaved in the manner described earlier in FIG. 12.

In other embodiments, other radar configurations can be implemented to achieve the same effect. For example, instead of capturing different pulses, analog beam forming pointing in different directions could be captured to produce the corresponding radar images for the two antenna modes.

The capability of supporting high resolution in the azimuth dimension and high resolution in the elevation dimension allows a robot to efficiently and effectively identify objects in its path for use in a navigation algorithm. Objects in the horizontal plane are identified when their azimuth angles fall within a predetermined range of azimuth range corresponding the robot's path. Tolerance values can also be introduced to accommodate inaccuracies, as discussed in FIG. 8. Objects in the vertical plane are identified in the manner already described in more detail in FIG. 7.

Figure 15:
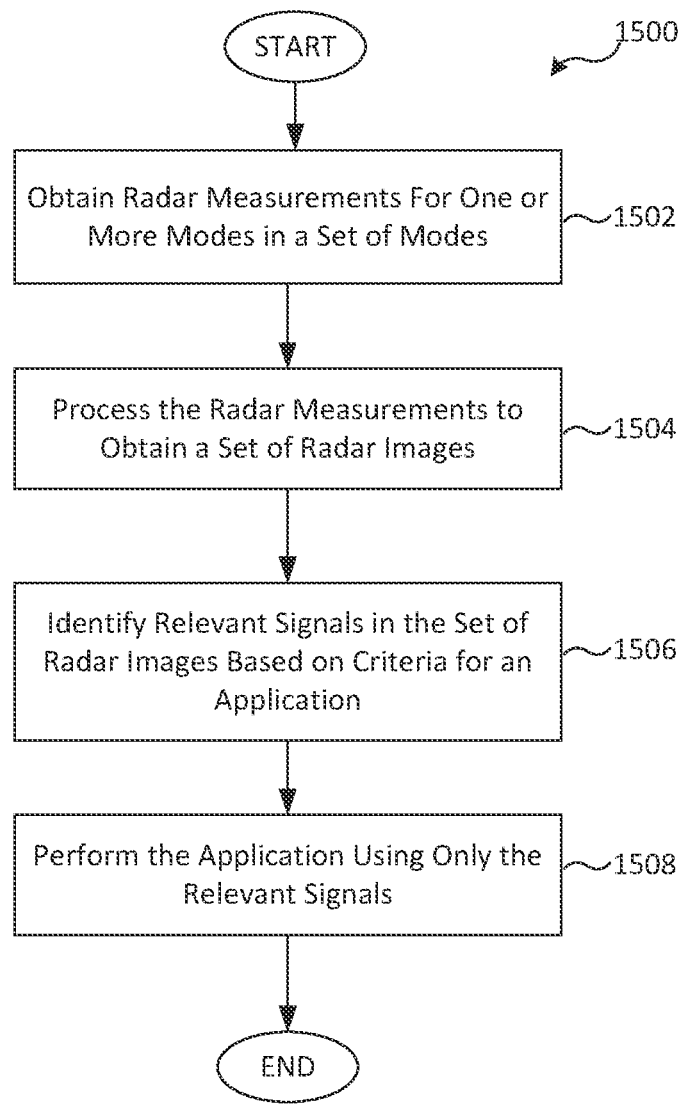
FIG. 15 illustrates a flowchart of a process for determining relevant signals according to various embodiments of the present disclosure.

FIG. 15 illustrates a flowchart of a process for determining relevant signals according to various embodiments of the present disclosure. A processor, such as processor 110 of electronic device 100, can execute instructions to cause the electronic device to perform the steps of flowchart 1500. In at least two non-limiting embodiments, the electronic device can be a robot determining relevant signals for target identification for a navigation algorithm as described in FIG. 8, or the electronic device can be a mobile electronic device determining relevant signals for a face authentication algorithm as described in FIG. 11.

The process begins at step 1502 by obtaining radar measurements for one or more modes in a set of modes. The number of modes and the configuration setting for each mode is dictated by the needs of application executing on the electronic device. For example, a motion detection application may utilize only a single mode radar for capturing radar measurements in the speed (i.e., Doppler) dimension. In yet another example, a navigation application may utilize multimodal radar using two or more modes for capturing radar measurements in the elevation and azimuth dimensions, which can be used to generate a multidimensional radar image.

The set of modes can include at least two modes that differ based on at least one of an antenna configuration for selecting active antenna elements and beamforming weights, or a radar timing configuration for determining a rate of obtaining the radar measurements. Additionally, in some embodiments the at least two modes operate concurrently through interleaved transmission bursts of the radar transceiver as described in FIG. 12.

In step 1504, the radar measurements obtained in step 1502 are processed into a set of radar images. The set of radar images can be a single radar image having a single dimension, as described in flowchart 400 in FIG. 4, or two or more radar images having multiple dimensions, as described in flowchart 600 in FIG. 6. For example, one or more of the radar images in the set of radar images can include at least two dimensions selected from an azimuth dimension, an elevation dimension, a range dimension, a speed dimension, and a polarization dimension.

Relevant signals for each of the set of radar images are identified in step 1506. Relevant signals can be determined with reference to signal determination criteria. In one embodiment, the relevant signals can be determined by inputting the radar image to an application, then comparing the output of that application to signal determination criteria. As an example, in step 806 of flowchart 800, the radar image is inputted to a target detection algorithm to detect targets, then the detected targets are compared to a target identification condition in step 808 to determine the relevant signals. In another embodiment, the relevant signals can be determined by comparing pixels of the radar image to signal determination criteria to determine relevant signals that can be then inputted into an application. For example, in step 906 of flowchart 900, pixels from a radar image are compared to a target identification condition, and the identified pixels are used to detect targets in step 908.

In step 1508, an application is performed using only the relevant signals identified in step 1506. In the depicted embodiment, the process terminates after step 1508; however, in another embodiment the process returns to step 1502.

In a non-limiting embodiment, the application performed in step 1508 is a navigation application and the at least two dimensions includes the azimuth dimension and the elevation dimension that define a path of travel. Further, identifying the relevant signals in step 1506 includes rejecting radar signals based on a target identification condition, and performing the application includes detecting objects within the path of travel.

In another non-limiting embodiment, the application performed in step 1508 is a facial recognition/authentication application and the at least two dimensions include the azimuth dimension, the elevation dimension, and the range dimension. Identifying relevant signals in step 1506 includes cropping radar signals to define a volume of space containing a user's head, and performing the application includes authenticating a face within the volume of space.

In yet another non-limiting embodiment, the application is a movement detection application and the at least two dimensions includes the speed dimension. Identifying relevant signals in step 1506 includes rejecting pixels from the set of radar images based on an associated speed, and performing the application includes identifying objects using a remainder of pixels in the set of radar images.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:

1. A method for signal selection by an electronic device, the method comprising:
   obtaining, via a radar transceiver of the electronic device, radar measurements for two or more modes in a set of modes;
   processing the radar measurements from the two or more modes to obtain a set of radar images corresponding to the two or more modes;
   identifying relevant signals in the set of radar images based on signal determination criteria for a gesture-recognition application, wherein the signal determination criteria differentiates between the relevant signals for the gesture-recognition application and irrelevant signals representing information beyond a scope of the gesture-recognition application; and
   performing the gesture-recognition application using the relevant signals in the set of radar images corresponding to the two or more modes.

2. The method of claim 1, wherein the one or more modes comprises one or more radar timing configurations for determining a rate of obtaining the radar measurements.

3. The method of claim 1, wherein each of the set of radar images comprises a range dimension and a speed dimension.

4. The method of claim 1, wherein:
   identifying the relevant signals further comprises rejecting pixels from the set of radar images based on an associated range, and
   performing the gesture-recognition application further comprises identifying a gesture using a remainder of pixels in the set of radar images.

5. The method of claim 1, wherein:
   identifying the relevant signals further comprises rejecting pixels from the set of radar images based on an associated speed and
   performing the gesture-recognition application further comprises identifying a gesture using a remainder of pixels in the set of radar images.

6. The method of claim 1, wherein:
   each of the set of radar images comprises a speed dimension, and
   performing the gesture-recognition application further comprises detecting movement of an object based on the speed dimension in one or more images in the set of radar images.

7. The method of claim 1, wherein:
   each of the set of radar images comprises a range dimension, and
   performing the gesture-recognition application further comprises identifying an object within a range of the electronic device based on the range dimension in one or more images in the set of radar images.

8. An electronic device, comprising:
   a radar transceiver configured to obtain radar measurements for two or more modes in a set of modes; and
   a processor operably coupled to the radar transceiver, the processor configured to:
   process the radar measurements from the two or more modes to obtain a set of radar images corresponding to the two or more modes;
   identify relevant signals in the set of radar images based on signal determination criteria for a gesture-recognition application, wherein the signal determination criteria differentiates between the relevant signals for the gesture-recognition application and irrelevant signals representing information beyond a scope of the gesture-recognition application; and
   perform the gesture-recognition application using the relevant signals in the set of radar images corresponding to the two or more modes.

9. The electronic device of claim 8, wherein the one or more modes comprises one or more radar timing configurations for determining a rate of obtaining the radar measurements.

10. The electronic device of claim 8, wherein each of the set of radar images comprises a range dimension and a speed dimension.

11. The electronic device of claim 8, wherein:
    in identifying the relevant signals, the processor is further configured to reject pixels from the set of radar images based on an associated range, and
    in performing the gesture-recognition application, the processor is further configured to identify a gesture using a remainder of pixels in the set of radar images.

12. The electronic device of claim 8, wherein:
    in identifying the relevant signals, the processor is further configured to reject pixels from the set of radar images based on an associated speed, and
    in performing the gesture-recognition application, the processor is further configured to identify a gesture using a remainder of pixels in the set of radar images.

13. The electronic device of claim 8, wherein:
    each of the set of radar images comprises a speed dimension, and
    in performing the gesture-recognition application, the processor is further configured to detect movement of an object based on the speed dimension in one or more images in the set of radar images.

14. The electronic device of claim 8, wherein:
    each of the set of radar images comprises a range dimension, and
    in performing the gesture-recognition application, the processor is further configured to identify an object within a range of the electronic device based on the range dimension in one or more images in the set of radar images.

15. A non-transitory, computer-readable medium storing instructions that, when executed by a processor of an electronic device, cause the electronic device to:
    obtain, via a radar transceiver of the electronic device, radar measurements for two or more modes in a set of modes;
    process the radar measurements from the two or more modes to obtain a set of radar images corresponding to each mode;
    identify relevant signals in the set of radar images based on signal determination criteria for a gesture-recognition application, wherein the signal determination criteria differentiates between the relevant signals for the gesture-recognition application and irrelevant signals representing information beyond a scope of the gesture-recognition application; and perform the gesture-recognition application using the relevant signals in the set of radar images corresponding to the two or more modes.

16. The non-transitory, computer-readable medium of claim 15, wherein the one or more modes comprises one or more radar timing configurations for determining a rate of obtaining the radar measurements.

17. The non-transitory, computer-readable medium of claim 15, wherein:
the instructions for identifying the relevant signals include further instructions that, when executed by the processor, cause the electronic device to reject pixels from the set of radar images based on an associated range, and
instructions for performing the gesture-recognition application include further instructions that, when executed by the processor, cause the electronic device to identify a gesture using a remainder of pixels in the set of radar images.

18. The non-transitory, computer-readable medium of claim 15, wherein:
the instructions for identifying the relevant signals include further instructions that, when executed by the processor, cause the electronic device to reject pixels from the set of radar images based on an associated speed, and
the instructions for performing the gesture-recognition application include further instructions that, when executed by the processor, cause the electronic device to identify a gesture using a remainder of pixels in the set of radar images.

19. The non-transitory, computer-readable medium of claim 15, wherein:
each of the set of radar images comprises a speed dimension, and
the instructions for performing the gesture-recognition application include further instructions that, when executed by the processor, cause the electronic device to detect movement of an object based on the speed dimension in one or more images in the set of radar images.

20. The non-transitory, computer-readable medium of claim 15, wherein:
each of the set of radar images comprises a range dimension, and
the instructions for performing the gesture-recognition application include further instructions that, when executed by the processor, cause the electronic device to identify an object within a range of the electronic device based on the range dimension in one or more images in the set of radar images.

* * * * *